US011567525B1

(12) United States Patent
Krueger

(10) Patent No.: US 11,567,525 B1
(45) Date of Patent: Jan. 31, 2023

(54) ILLUMINATED KNOB FOR AN APPLIANCE

(71) Applicant: Haier US Appliance Solutions, Inc., Wilmington, DE (US)

(72) Inventor: Suzanne M. Krueger, Georgetown, TX (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/499,096

(22) Filed: Oct. 12, 2021

(51) Int. Cl.
*G05G 1/01* (2008.04)
*G05G 1/10* (2006.01)
*F21V 33/00* (2006.01)
*F21Y 115/10* (2016.01)
*F21W 131/307* (2006.01)

(52) U.S. Cl.
CPC ......... *G05G 1/105* (2013.01); *F21V 33/0044* (2013.01); *F21V 2200/00* (2015.01); *F21W 2131/307* (2013.01); *F21Y 2115/10* (2016.08)

(58) Field of Classification Search
CPC ...... G05G 1/105; G05G 1/10; F21V 2200/00; F21V 33/0044; F21Y 2115/10; F21W 2131/307; Y10T 74/2084; Y10S 116/36; B60K 37/06; B60K 2370/126; B60K 2370/336; B60K 2370/33; B60K 2370/332; H01H 2219/0622; H01H 2219/056; H01H 2009/164; H01H 21/025; H01H 9/161; H01H 2219/062; H01H 19/14; G02B 6/0096; G02B 6/0033; G02B 6/0016; G01D 11/28; B60H 1/00985
See application file for complete search history.

(56) References Cited

U.S. PATENT DOCUMENTS

| 4,807,091 | A  | * | 2/1989 | Obata .................... G05G 1/105 116/286 |
| 6,590,174 | B2 |   | 7/2003 | Zysnarski |
| 7,500,774 | B2 | * | 3/2009 | Nishiyama ........... G02B 6/0021 362/23.15 |
| 10,345,514 | B2 |   | 7/2019 | Kozinski |
| 10,401,035 | B2 |   | 9/2019 | Pionek |
| 2005/0284741 | A1 | * | 12/2005 | Suzuki ................. H01H 19/025 200/310 |
| 2013/0270251 | A1 | * | 10/2013 | Furuti ...................... H05B 3/68 219/447.1 |
| 2015/0162148 | A1 | * | 6/2015 | Murzyn ............... H01H 25/008 200/4 |

FOREIGN PATENT DOCUMENTS

| CN | 205721475 U | 11/2016 | |
| CN | 206209148 U | 5/2017 | |
| CN | 207962745 U | 10/2018 | |
| FR | 2944092 A1 * | 10/2010 | ............ F24C 15/008 |
| JP | 4725384 B2 * | 7/2011 | |
| WO | WO2010007076 A1 | 1/2010 | |
| WO | WO2018212733 A2 | 11/2018 | |

* cited by examiner

Primary Examiner — Omar Rojas Cadima

(74) Attorney, Agent, or Firm — Dority & Manning, P.A.

(57) ABSTRACT

A knob for an appliance includes a handle. A light guide defines a recess. At least a portion of the handle is received within the recess of the light guide. A bezel is disposed over at least a portion of the light guide. The handle is rotatable relative to the bezel. A light emitter is disposed within the bezel. The light emitter is operable to emit light into the light guide. At least a portion of an interior surface of the light guide is textured, and an exterior surface of the light guide is smooth.

18 Claims, 9 Drawing Sheets

ILLUMINATED KNOB FOR AN APPLIANCE

FIELD OF THE INVENTION

The present subject matter relates generally to knobs for appliances.

BACKGROUND OF THE INVENTION

Appliances frequently include a knob for controlling operation of certain appliance features. Certain knobs can be illuminated. However, known illuminated knobs have drawbacks. For instance, the lighting can be dim or subdued. An illuminated knob for an appliance with features for bright and/or bold lighting would be useful.

BRIEF DESCRIPTION OF THE INVENTION

Aspects and advantages of the invention will be set forth in part in the following description, or may be apparent from the description, or may be learned through practice of the invention.

In one example embodiment, a knob for an appliance includes a handle. A light guide defines a recess. At least a portion of the handle is received within the recess of the light guide. A bezel is disposed over at least a portion of the light guide. The handle is rotatable relative to the bezel. A light emitter is disposed within the bezel. The light emitter is operable to emit light into the light guide. At least a portion of an interior surface of the light guide is textured, and an exterior surface of the light guide is smooth.

In another example embodiment, an appliance includes a cabinet. A knob is disposed on the cabinet. The knob includes a handle and a light guide defining a recess. At least a portion of the handle is received within the recess of the light guide. A bezel is mounted on the cabinet and is disposed over at least a portion of the light guide, the handle rotatable relative to the bezel. A light emitter is disposed within the bezel. The light emitter is operable to emit light into the light guide. At least a portion of an interior surface of the light guide is textured, and an exterior surface of the light guide is smooth.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
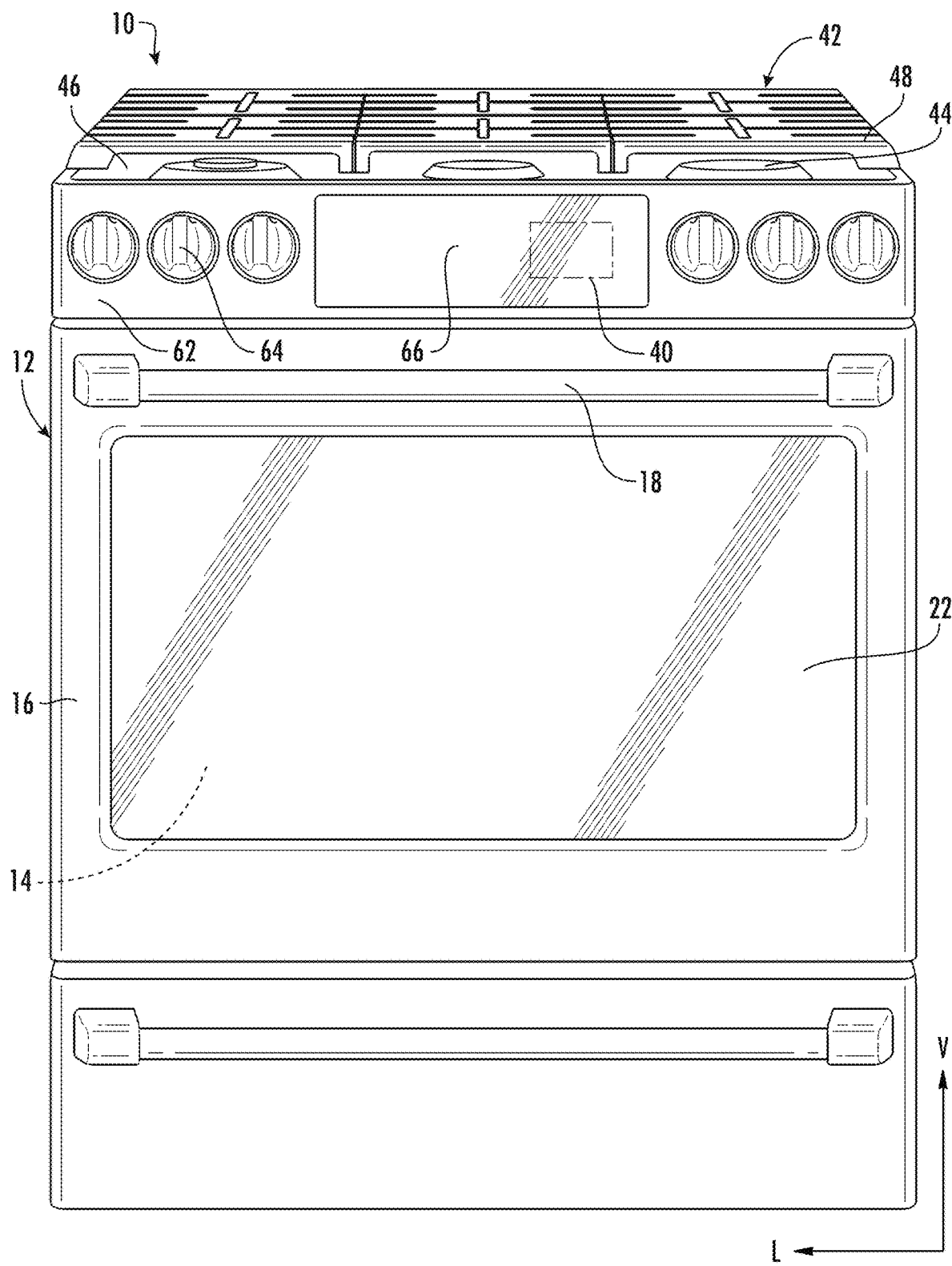
FIG. 1 is a front view of an oven appliance according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Referring now to the figures, FIG. 1 is a front view of a cooking appliance, such as an oven appliance 10, according to an example embodiment of the present disclosure. Generally, the oven appliance 10 defines a vertical direction V, a lateral direction L, and a transverse direction T. The vertical direction V, lateral direction L, and transverse direction T are mutually perpendicular and form an orthogonal direction system. As will be understood, the oven appliance 10 is provided by way of example only, and the present subject matter may be used in any suitable appliance. Thus, the present disclosure may be used with other oven, range, or oven appliance configurations (e.g., configurations that define multiple interior cavities for the receipt of food, include no interior cavities, or are otherwise different than the configuration shown in FIG. 1), as well as other suitable appliances, as would be understood in light of the present disclosure.

The oven appliance 10 includes an insulated cabinet 12 with an interior cooking chamber 14 defined by an interior surface of cabinet 12. The cooking chamber 14 is configured for the receipt of one or more food items to be cooked. The oven appliance 10 includes a door 16 rotatably mounted to cabinet 12 (e.g., with a hinge—not shown). A handle 18 may be mounted to door 16 and may assist a user with opening and closing door 16 in order to access an opening to cooking chamber 14. For example, a user can pull on the handle 18 to open or close door 16 and access cooking chamber 14 through the opening. As would be understood, one or more internal heating elements (e.g., baking or broiling heating elements) may be provided within cooking chamber 14 to cook or otherwise heat items therein.

Further, the oven appliance 10 can include a seal (not shown) between the door 16 and the cabinet 12 that assist with maintaining heat and cooking fumes within cooking chamber 14 when the door 16 is in a closed position, as shown in FIG. 1. One or more parallel glass panes 22 provide for viewing the contents of cooking chamber 14 when door 16 is closed and assist with insulating cooking chamber 14. Optionally, a baking rack (not pictured) is positioned in cooking chamber 14 for the receipt of food items or utensils containing food items.

Moreover, the oven appliance 10 may include a cooktop surface 42 having one or more heating elements 44 for use in heating or cooking operations. In exemplary embodiments, the cooktop surface 42 is comprised of a metal (e.g., steel) panel 46 on which one or more grates 48, described in further detail below, may be supported. In other embodiments, however, the cooktop surface 42 may be constructed of another suitable material, such as a ceramic glass or another suitable non-metallic material. In alternative embodiments, the oven appliance 10 may be a wall oven without the cooktop surface 42.

Further, the heating elements 44 may be various sizes, as shown in FIG. 1, and may employ any suitable method for heating or cooking an object, such as a cooking utensil (not shown), and its contents. In one embodiment, for example, the heating element(s) 44 may use a heat transfer method, such as electric coils or gas burners, to heat the cooking utensil. In another embodiment, however, the heating element(s) 44 uses an induction heating method to heat the cooking utensil directly. In turn, heating element may include a burner element, electric heat element, induction element, or another suitable heating element.

Some embodiments of the oven appliance 10 may further include a controller 40, e.g., configured to control one or more operations of oven appliance 10. For example, the controller 40 may control at least one operation of the oven appliance 10 that includes an internal heating element or cooktop heating element 44 and/or the door 16. As such, the controller 40 may be in communication (e.g., via a suitable wired or wireless connection) with one or more of heating element(s) 44, as well as any other suitable components of the oven appliance 10, as discussed herein. In general, the controller 40 may be operable to configure the oven appliance 10 (and various components thereof) for cooking. Such configuration may be based, for instance, on a plurality of cooking factors of a selected operating cycle or mode.

By way of example, the controller 40 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

In an embodiment, the controller 40 may be positioned in a variety of locations throughout the oven appliance 10. As illustrated, the controller 40 may be located within a user interface 62 of the oven appliance 10. In some such embodiments, input/output ("I/O") signals may be routed between the controller 40 and various operational components of the oven appliance 10, such as the door 16, the heating element(s) 44, control knobs 64, display component 66, sensors, alarms, or other components as may be provided. For instance, signals may be directed along one or more wiring harnesses that may be routed through cabinet 12. In some embodiments, the controller 40 is in communication with the user interface assembly 62 and the control knobs 64 through which a user may select various operational features and modes and monitor progress of the oven appliance 10. In one embodiment, the user interface 62 may represent a general purpose I/O ("GPIO") device or functional block. In another embodiment, the user interface 62 may include input components, such as one or more of a variety of electrical, mechanical, or electro-mechanical input devices including rotary dials, push buttons, and touch pads. Further, the user interface 62 may include a display component 66, such as a digital or analog display configured to provide operational feedback to a user.

Figure 2:
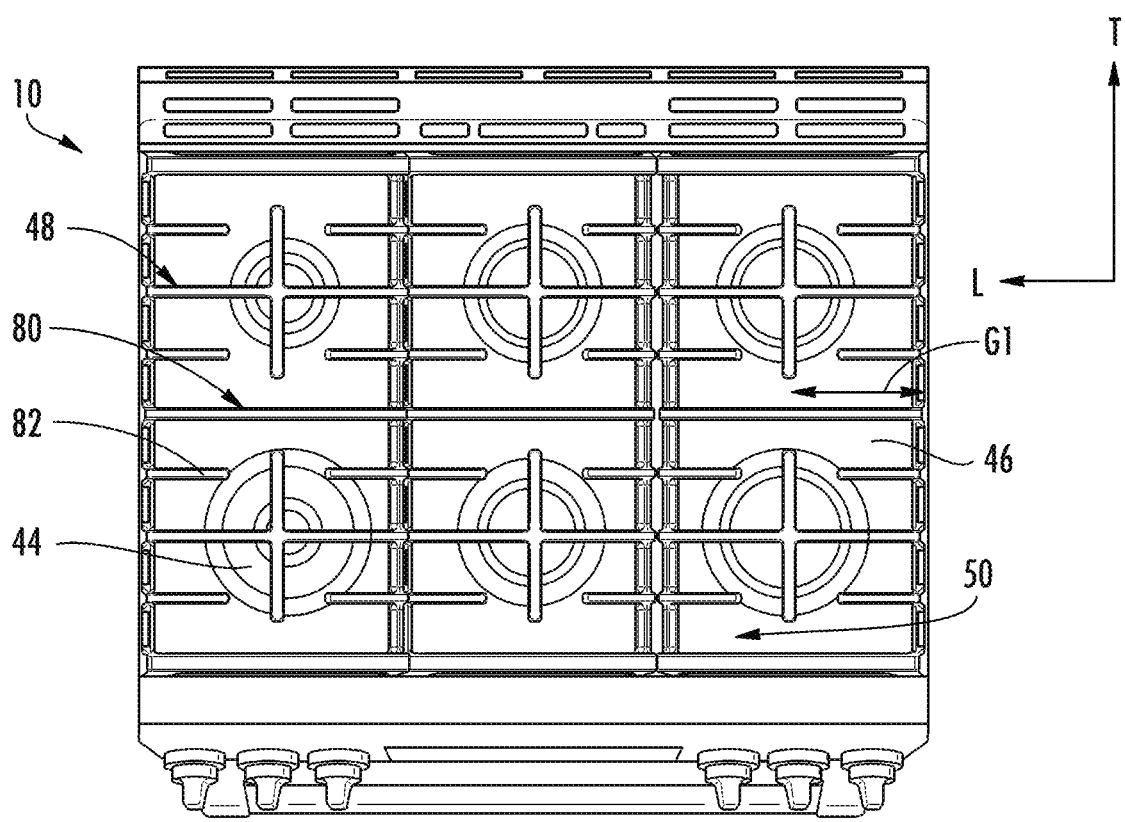
FIG. 2 provides a top view of the example oven appliance of FIG. 1.
Figure 3:
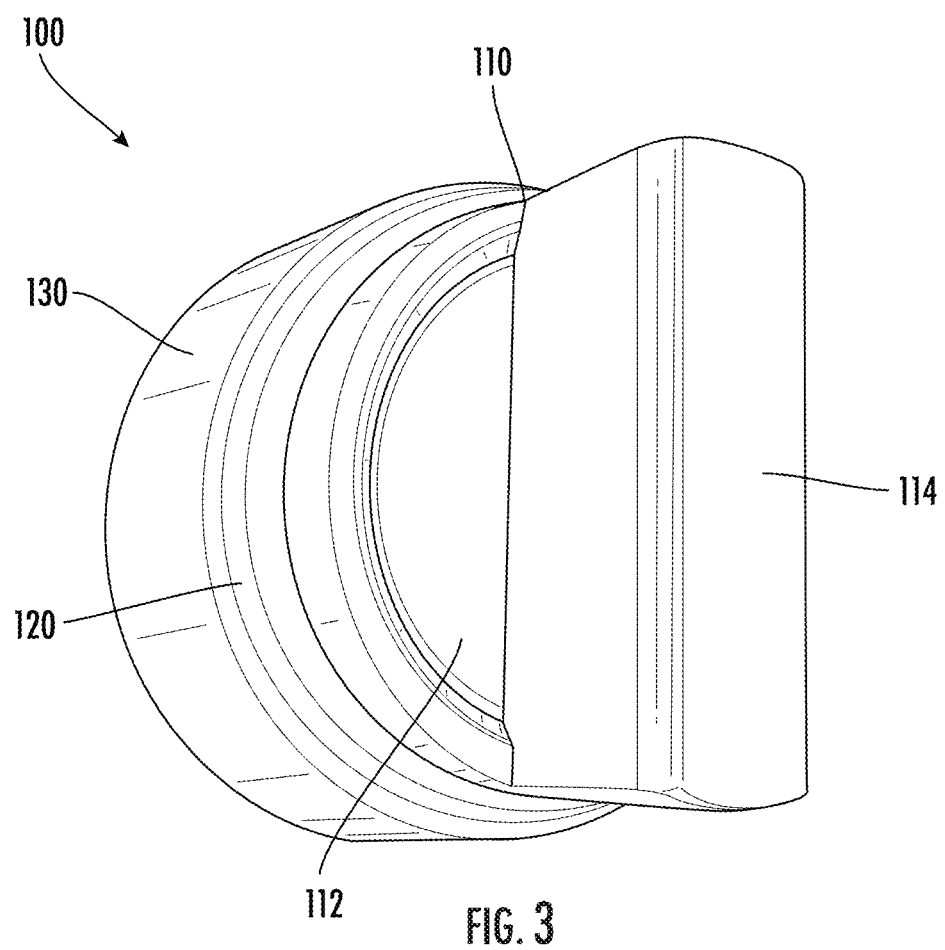
FIG. 3 is a perspective view of a knob according to an example embodiment of the present subject matter.
Figure 4:
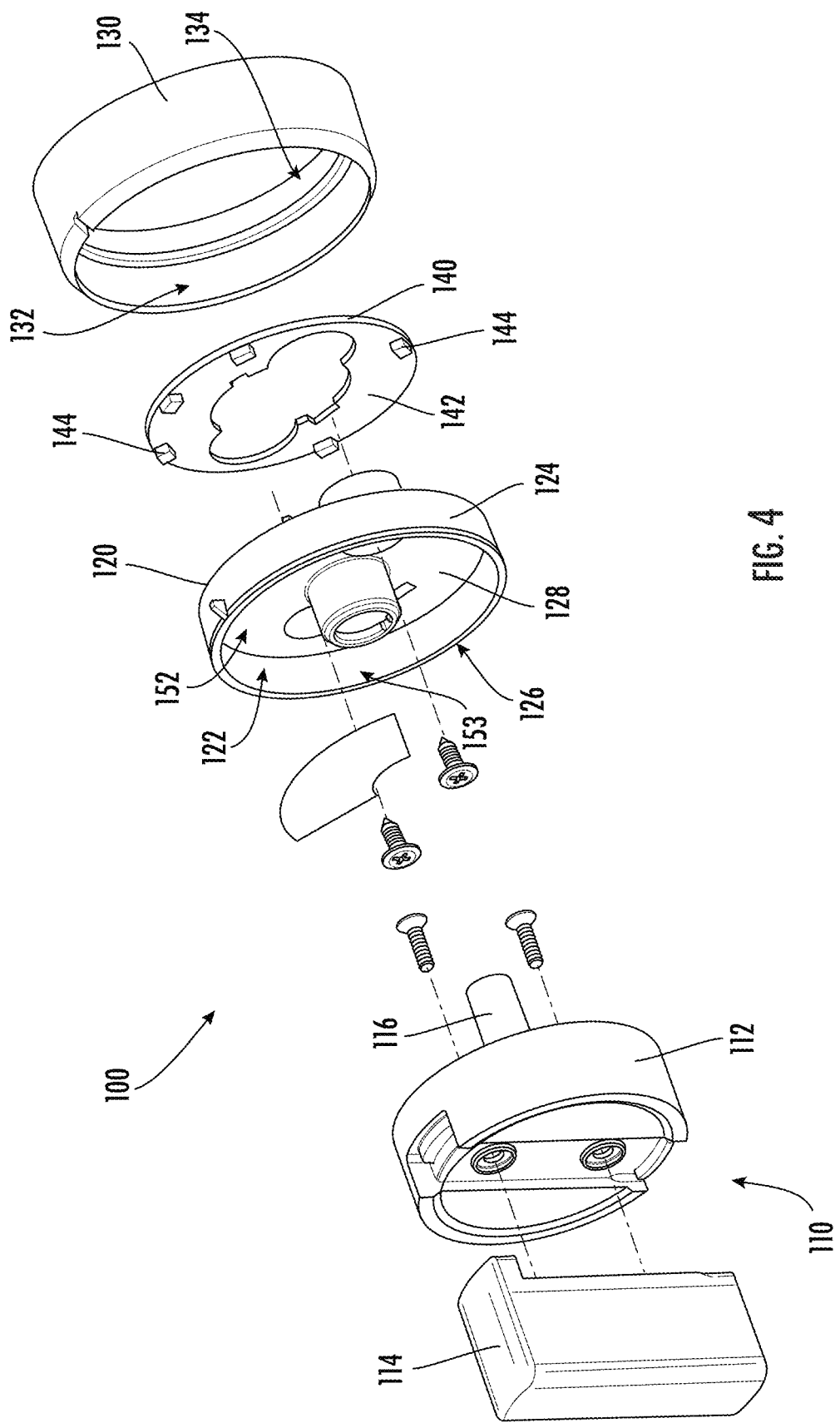
FIG. 4 is an exploded view of the example knob of FIG. 3.
Figure 5:
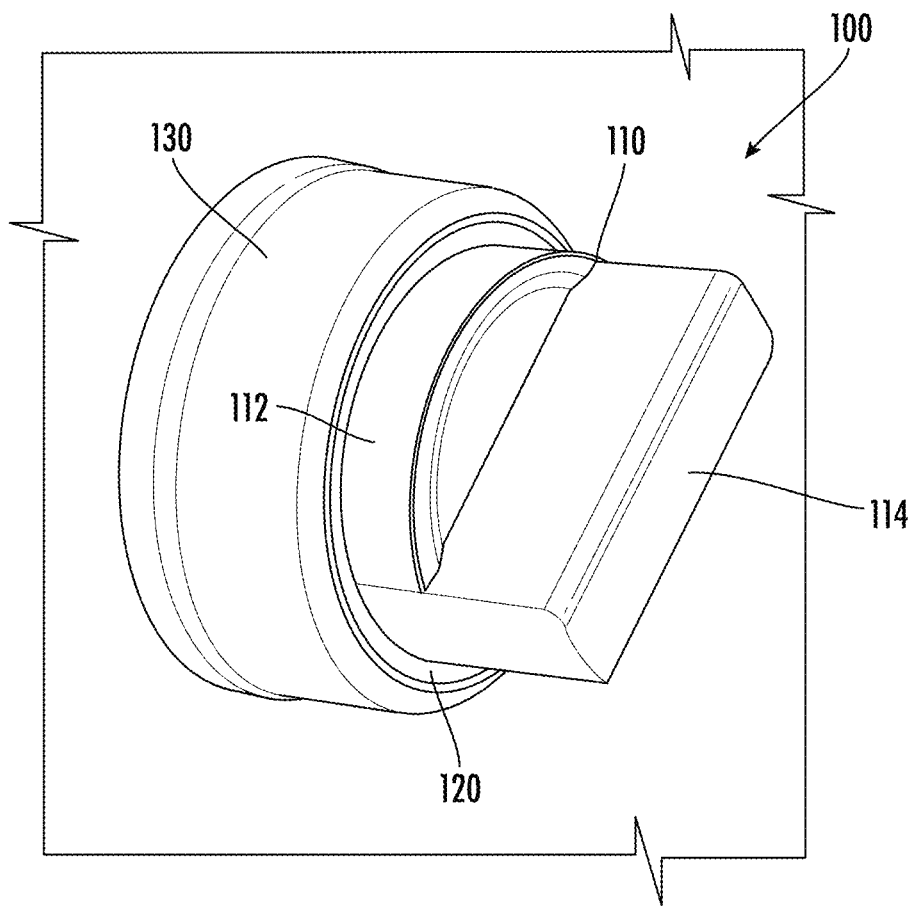
FIG. 5 is a perspective view of a knob according to another example embodiment of the present subject matter.
Figure 6:
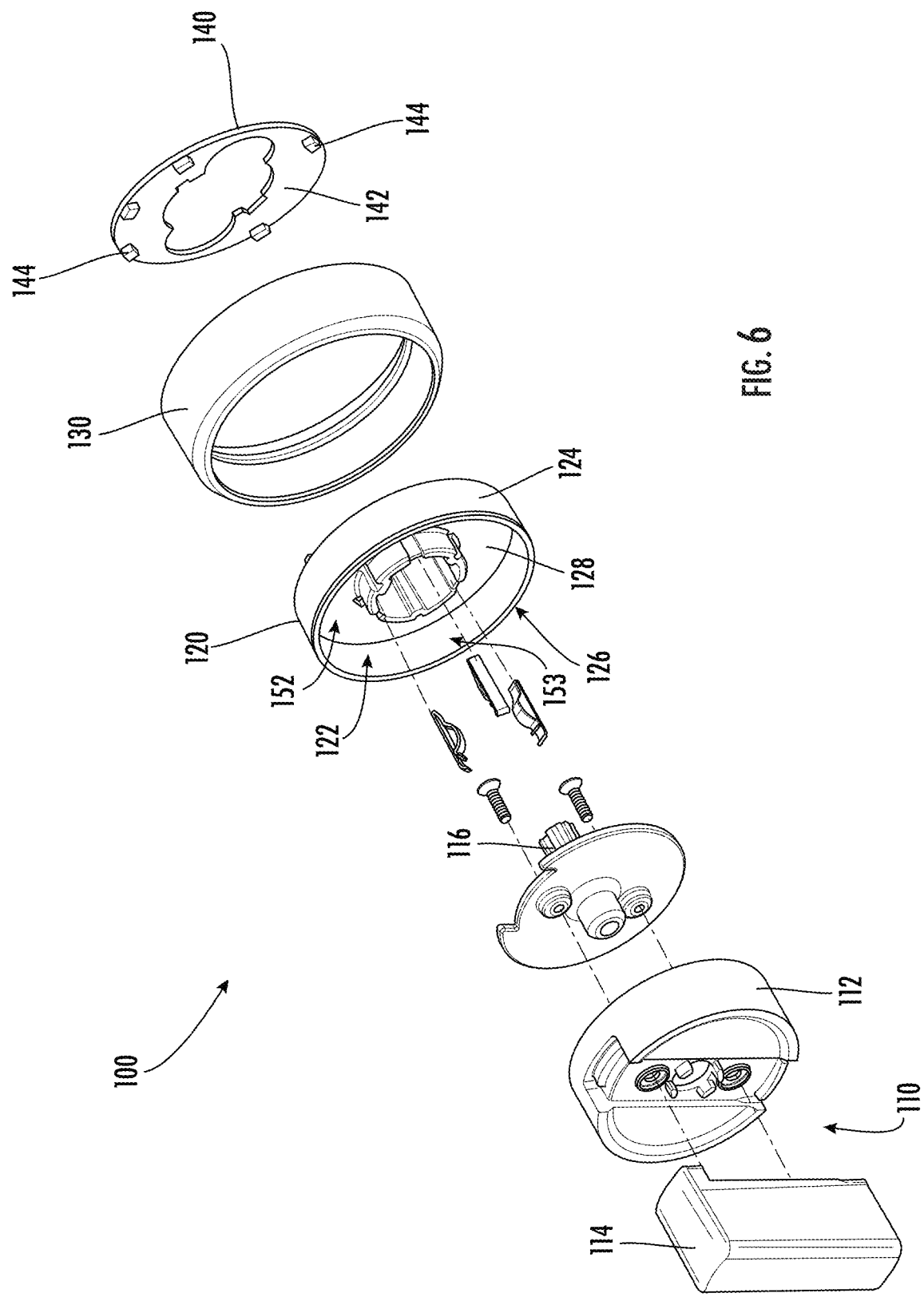
FIG. 6 is an exploded view of the example knob of FIG. 5.

Referring now to FIG. 2, a top view of the oven appliance 10 of FIG. 1 is illustrated. As described above, the cooktop surface 42 may include a plurality of heating elements 44 and a panel 46. The panel 46 may be concave (e.g., downward along the vertical direction V) to form a depression or cavity 50 therein. Thus, the heating element(s) 44 may be provided within the cavity 50, and cooking grates 48 may be positioned over top of the heating element(s) 44 (e.g., along the vertical direction V). In this example, the cooktop surface 42 includes six heating elements 44. It should be noted that the disclosure is not limited to this, and the cooktop surface 42 may include fewer or more heating elements 44 as specific applications dictate. In some embodiments, one or more heating elements 44 may be located proximate an edge of panel 46, as will be described in more detail below.

In addition, as shown, the cooktop surface 42 may include one or more cooking grates 48 provided over the heating elements 44. As shown in FIG. 2, for example, the cooktop surface 42 may include three cooking grates 48. It should be noted that the disclosure is not limited to this, and the cooktop surface 42 may include fewer or more cooking grates 48 as specific applications dictate. Each cooking grate 48 may extend from a rear of panel 46 to a front of the panel 46 along the transverse direction. Additionally, or alternatively, the cooking grates 48 may be positioned adjacent to each other along the lateral direction L.

Turning now to FIGS. 3 through 8, a knob 100 according to an example embodiment of the present subject matter will be described in greater detail below. Knob 100 includes features illuminating knob with a bright, even, and/or bold light. Thus, knob 100 may provide an elevated lighting experience relative to known illuminated knobs. Knob 100 in FIGS. 3 and 4 may be used with one of heating elements 44, and knob 100 in FIGS. 5 and 6 may be used with the baking or broiling heating elements within oven appliance 10. Knob 100 in FIGS. 3 and 4 and knob 100 in FIGS. 5 and 6 include numerous common components and may be constructed in the same or similar manner except as noted herein.

As shown in FIGS. 3 through 6, knob 100 may include a handle 110. Handle 110 may include a base 112, a blade 114, and a post 116. Blade 114 may be mounted to base 112. For example, blade 114 may be fastened, adhered, integrally formed with, etc. to base 112. Thus, e.g., a user may grasp blade 114 to rotate base 112. Base 112 may be cylindrical and include a setting indicia on an outer surface of base 112. When the user rotates base 112 by grasping blade 114, the indicia on base 112 may indicate the operational setting for an associated appliance corresponding to the current rotational position of handle 110. Post 116 may extend from base 112 and be coupled to a gas valve (not shown) for a gas burner, such as one of heating elements 44. Post 116 may be integrally formed with base 112, e.g., such that post 116 and base 112 are formed from a common piece of material. Thus, the user may adjust the gas valve by rotating handle 110 due to post coupling handle 110 to the gas valve.

Knob 100 also includes a light guide 120. Light guide 120 defines a recess 122, and at least a portion of handle 110 may be received within recess 122 of light guide 120. Thus, handle 110 may be at least partially inset within recess 122 of light guide 120, e.g., such that an annular sidewall 124 of light guide 120 extends circumferentially around base 112 of handle 110. Moreover, Post 116 of handle 110 may extend through a base plate 128 of light guide 120 and/or through a center wall (not labeled) of light guide 120. Light guide 120 may be constructed of or with a transparent or translucent material. Thus, as discussed in greater detail below, light from a light emitter 140 within knob 100 may reflect within or pass through light guide 120 to an exterior of knob 100. As a particular example, light guide may be constructed of or with an amorphous permanently transparent polyamide, such as Trogamid® CX. The amorphous permanently transparent polyamides may have a high Abbe value, e.g., no less than fifty (50), to assist with focusing all colors to the same point.

Knob 100 also includes a bezel 130. Bezel 130 is disposed over at least a portion of light guide 120. In particular, bezel 130 may extend circumferentially around annular sidewall 124 of light guide 120 and base 112 of handle 110. Bezel 130 may be generally cylindrical, and an inner diameter of bezel 130 may be greater than an outer diameter of annular sidewall 124. Thus, light guide 120 may be at least partially received within bezel 130. Bezel 130 may be constructed of or with an opaque material. Thus, light from light emitter 140 within knob 100 may be blocked by bezel 130. In particular, bezel 130 may block a user from viewing light emitter 140 and/or light guide 120, except for the selected exposed portion of light guide 120. Bezel 130 may be fixed to a cabinet, such as cabinet 12, in certain example embodiments, e.g., as with knob 100 shown in FIGS. 3 and 4. In alternative example embodiments, bezel 130 may be rotatable on a cabinet, such as cabinet 12, e.g., as with knob 100 shown in FIGS. 5 and 6. In addition, light guide 120 may be fixed to bezel 130, e.g., such that bezel 130 is not rotatable relative to light guide 120. In contrast, handle 110 may be rotatable relative to bezel 130. Thus, the user may rotate handle 110 to adjust operation of the associated appliance without rotating light guide 120 and/or bezel 130.

Light emitter 140 may be disposed within bezel 130. Thus, bezel 130 may extend circumferentially around light emitter 140. For knob 100 shown in FIGS. 5 and 6, bezel 130 may be rotatable with handle 110, and light emitter 140 may be fixed to cabinet 12, e.g., at user interface 62. Light emitter 140 may also be fixed to bezel 130, e.g., using fasteners, adhesive, snap-fit connectors, etc. Light emitter 140 is operable to emit light into light guide 120. For instance, light emitter 140 may include a circuit board 142 and a plurality of light emitting diodes (LEDs) 144. LEDs 144 may be distributed, e.g., circumferentially, on circuit board 142, and LEDs 144 may be oriented on circuit board 142 for emitting light towards light guide 120. In alternative example embodiments, light emitter 140 may be another suitable type of light emitter, such as incandescent bulbs.

Figure 9:
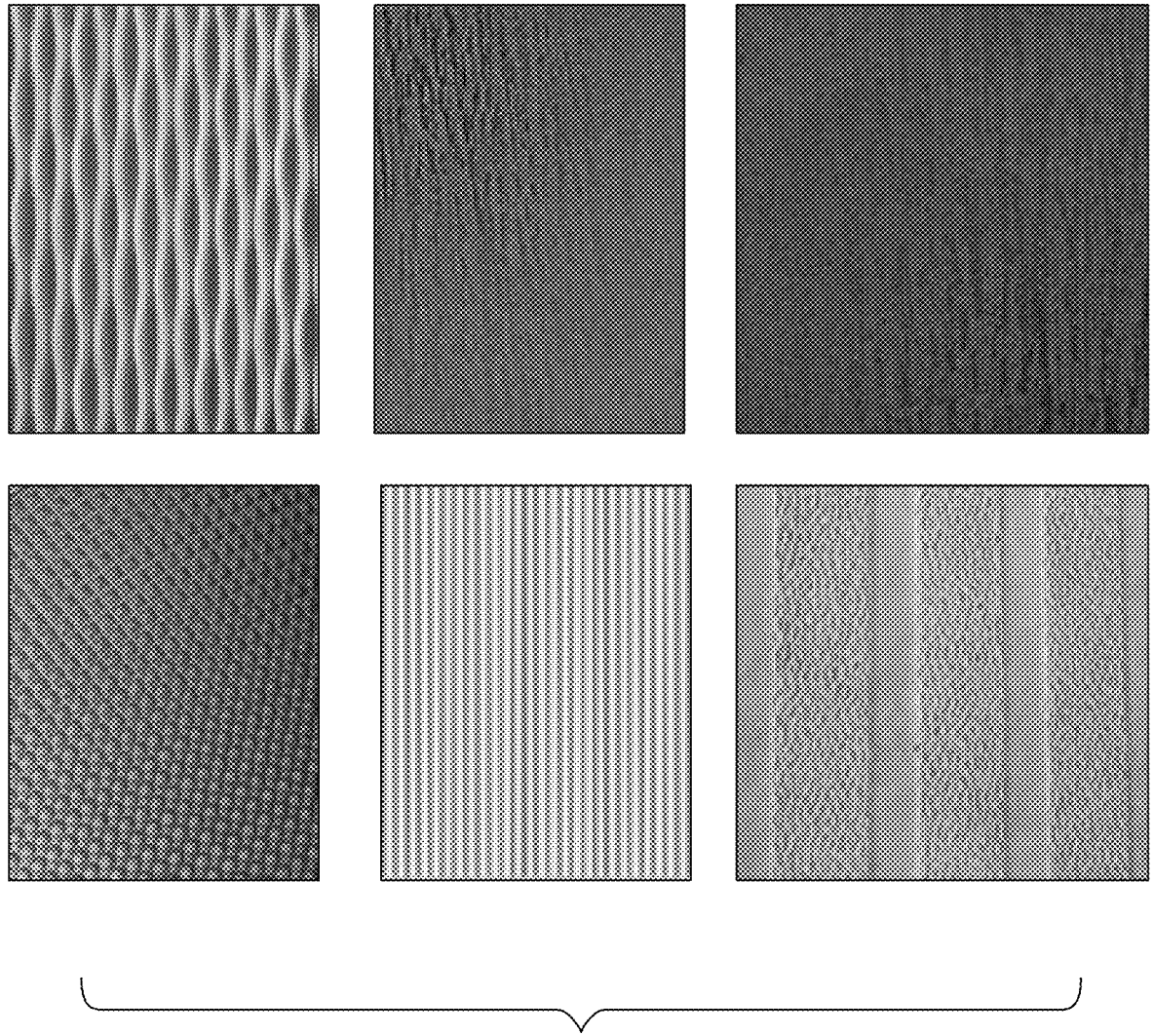
FIG. 9 illustrates various example surface textures for the example knob of FIG. 3.

Light guide 120 includes features for providing bold, even, and/or bright light from light emitter 140 to a user of knob 100. In particular, at least a portion of an interior surface 125 of light guide 120 may be textured, and the remaining surfaces of light guide 120, e.g., including at least a portion of an exterior surface 126 of light guide 120, may be smooth. At least a portion of the interior surface 125 of light guide 120 may be textured such that the at least a portion of interior surface 125 of light guide 120 has an unsmooth, raised pattern formed on thereon. In contrast, the remaining surfaces of light guide 120, e.g., including at least a portion of the exterior surface 126 of light guide 120, may be smooth such that the remaining surfaces of light guide 120 are regular, even, and without perceptible (e.g., visible or feelable by contact) holes, lumps, or projections. In certain example embodiments, the textured interior surface 125 of light guide 120 may include a plurality of linear ridges, a plurality of linear troughs, or both. In particular, the textured interior surface 125 of light guide 120 may be a blasted matte diecast surface. In certain example embodiments, textured interior surface 125 of light guide 120 may be finished to a SP1-D3 surface finish standard, and/or the remaining surfaces of light guide 120, including smooth exterior surface 126 of light guide 120, may be finished to a SP1-A2 surface finish standard. The interior surface 125 may have a near zero reflectivity due to the texturing on interior surface 125. For instance, the reflection factor of interior surface 125 may be at a zero angle of incidence. Various example surface textures for interior surface 125, which are formable during an injection molding process for light guide 120, are shown in FIG. 9. Each of the various surface textures may be formed on interior surface 125.

Figure 7:
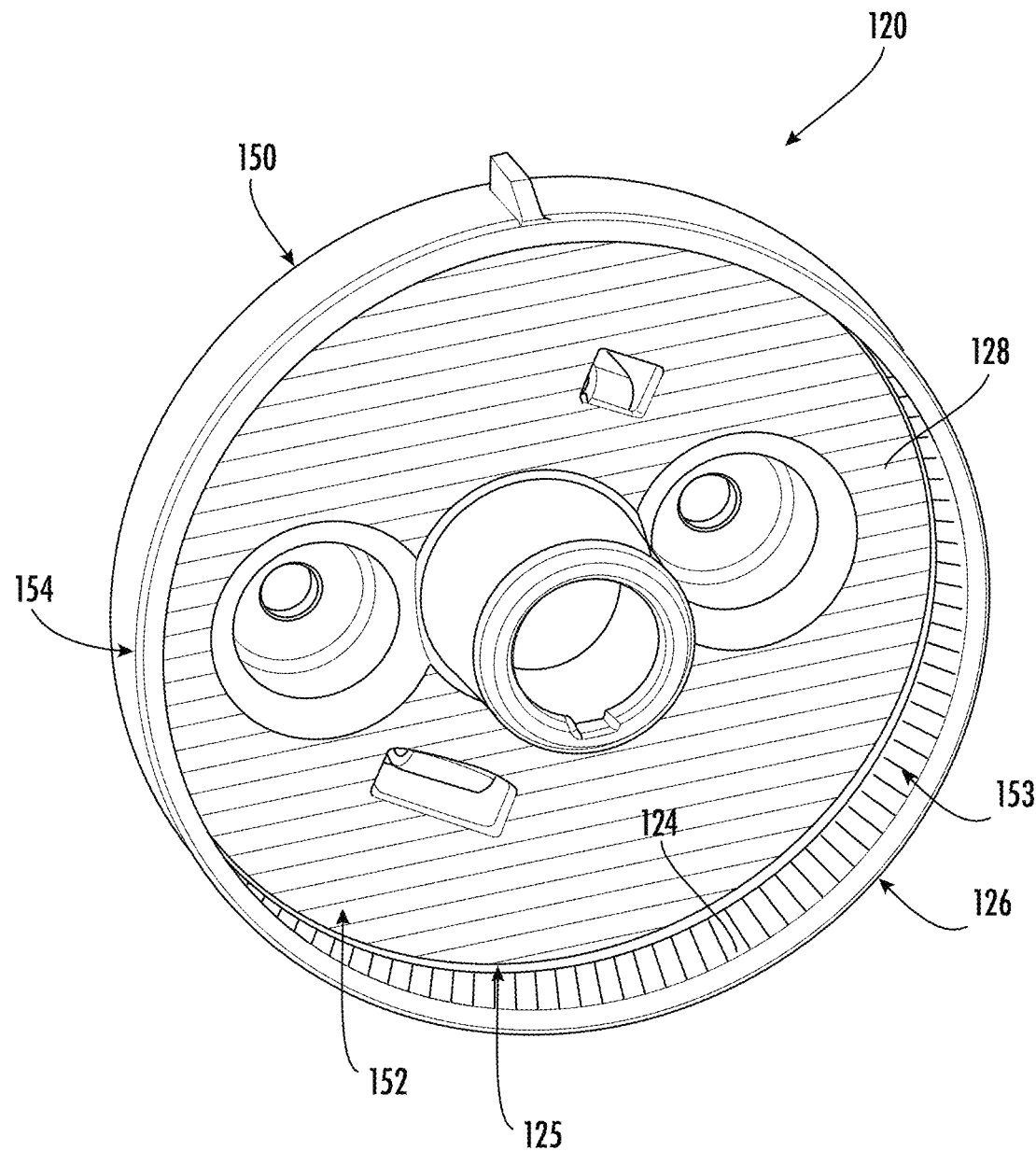
FIG. 7 is a rear perspective view of a bezel of the example knob of FIG. 3.
Figure 8:
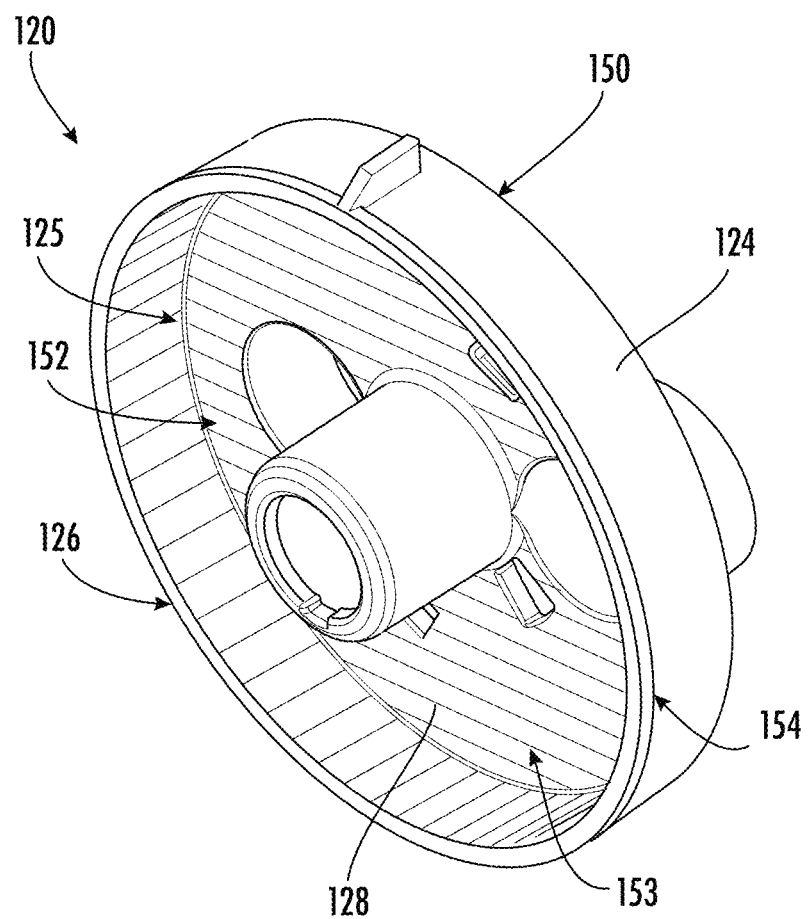
FIG. 8 is a front perspective view of the bezel of FIG. 7.

As shown in FIGS. 7 and 8, light guide 120 may include annular sidewall 124 and a base plate 128. Base plate 128 may have a first side 150 and a second side 152 positioned opposite each other on base plate 128. First side 150 of base plate 128 may face towards light emitter 140, and second side 152 of base plate 128 may face away from light emitter 140, e.g., toward recess 122. Textured interior surface 125 may be defined on second side 152 of base plate 128, and annular sidewall 124 may extend from second side 152 of base plate 128. Textured interior surface 125 may also be defined on an interior surface 153 of annular sidewall 124, e.g., that faces recess 122. The texturing on second side 152 of base plate 128 may be oriented, e.g., about, perpendicular to the texturing on interior surface 153 of annular sidewall 124. For instance, the texturing on second side 152 of base plate 128 may be linear troughs and/or ridges oriented, e.g., about, perpendicular to linear troughs and/or ridges in the texturing on interior surface 153 of annular sidewall 124. The remaining surfaces of light guide 120 may be smooth. For example, smooth exterior surface 126 may be defined at least on a distal end 154 of annular sidewall 124, e.g., that is spaced from second side 152 of base plate 128. Such smooth exterior surface 126 may be annular and extend circumferentially around handle 110. Handle 110 may also be positioned opposite light emitter 140 about base plate 128. As another example, textured interior surface 125 may also be defined on first side 150 of base plate 128.

When light emitter 140 operates to emit light, the light from light emitter 140 may reflect within or pass through light guide 120 to an exterior of knob 100. In particular, the light from light emitter may enter light guide 120 at textured interior surface 125 and exit light guide 120 at smooth exterior surface 126. Light from light emitter 140 passing through the textures on interior surface 125 scatters and slows down the light from light emitter 140. Thus, significant direct light from light emitter 140 is unlikely to be visible at smooth exterior surface 126, and light emitter 140 may not be directly visible to a user of knob 100. In contrast, smooth exterior surface 126 may be visible to the user of knob 100, and light from light emitter 140 exiting light guide 120 at smooth exterior surface 126 may not scatters and/or slow down, e.g., due to the lack of texturing on smooth exterior surface 126. Moreover, smooth exterior surface 126 may have a "glass" like appearance. Thus, knob 100 may be illuminated bright, even, and/or bold light from light emitter 140 due to the construction of light guide 120.

In certain example embodiments, bezel 130 may also include features for providing bold, even, and/or bright light from light emitter 140 to a user of knob 100. In particular, at least a first interior surface portion 132 of bezel 130 may be textured, and at least a second interior surface portion 134 of bezel 130 may be smooth. First and second interior surface portions 132, 134 may be spaced apart axially within bezel 130, and each of first and second interior surface portions 132, 134 may extend circumferentially along the inner surface of bezel 130. The textured and smooth surfaces of bezel 130 may be formed in the same or similar manner to that described above for light guide 120. Moreover, in certain example embodiments, textured first interior surface portion 132 of bezel 130 may be finished to a SP1-D3 surface finish standard, and/or the smooth second interior surface portion 134 of bezel 130 may be finished to a SP1-A2 surface finish standard.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A knob for an appliance, comprising:
   a handle;
   a post extending from the handle;
   a light guide defining a recess, at least a portion of the handle received within the recess of the light guide;
   an annular bezel disposed over at least a portion of the light guide, an annular sidewall of the handle at least partially disposed within the bezel, the handle rotatable relative to the bezel; and
   a light emitter disposed within the bezel, the light emitter operable to emit light into the light guide,
   wherein at least a portion of an interior surface of the light guide is textured, and an exterior surface of the light guide is smooth, and
   wherein at least a first portion of an interior surface of the bezel is textured, and at least a second portion of an interior surface of the bezel is smooth.

2. The knob of claim 1, wherein the textured interior surface of the light guide comprises one or more of a plurality of linear ridges and a plurality of linear troughs.

3. The knob of claim 1, wherein the textured interior surface of the light guide comprises a matte diecast surface.

4. The knob of claim 1, wherein the light guide is constructed of amorphous permanently transparent polyamide.

5. The knob of claim 1, wherein the light guide comprises a base plate and an annular sidewall, the textured interior surface defined on at least one side of the base plate and an inner surface of the annular sidewall, the annular sidewall extending from the base plate, the smooth exterior surface defined on at least a distal end of the annular sidewall.

6. The knob of claim 5, wherein the annular sidewall is disposed over at least a portion of the handle.

7. The knob of claim 5, wherein the handle is positioned opposite the light emitter about the base plate of the light guide.

8. The knob of claim 1, wherein the light guide comprises a circuit board and a plurality of light emitting diodes, the plurality of light emitting diodes distributed circumferentially on the circuit board.

9. The knob of claim 1, wherein the post extends from the handle along an axial length of the post, the axial length of the post is greater than an axial length of the annular sidewall of the handle, the post extends along the axial length of the post through the bezel, and a width of the post perpendicular to the axial length of the post is less than a width of the annular sidewall of the handle.

10. An appliance, comprising:
    a cabinet;
    a valve disposed within the cabinet; and
    a knob disposed on the cabinet, the knob comprising
      a handle,
      a post extending from the handle and coupling the handle to the valve;
      a light guide defining a recess, at least a portion of the handle received within the recess of the light guide,
      an annular bezel mounted on the cabinet and disposed over at least a portion of the light guide, an annular sidewall of the handle at least partially disposed within the bezel, the handle rotatable relative to the bezel, and
      a light emitter disposed within the bezel, the light emitter operable to emit light into the light guide,
      wherein at least a first portion of an interior surface of the light guide is textured, at least a second portion of an interior surface of the bezel is smooth, and an exterior surface of the light guide is smooth.

11. The appliance of claim 10, wherein the textured interior surface of the light guide comprises one or more of a plurality of linear ridges and a plurality of linear troughs.

12. The appliance of claim 10, wherein the textured interior surface of the light guide comprises a matte diecast surface.

13. The appliance of claim 10, wherein the light guide is constructed of amorphous permanently transparent polyamide.

14. The appliance of claim 10, wherein the light guide comprises a base plate and an annular sidewall, the textured interior surface defined on a first side of the base plate, the annular sidewall extending from a second side of the base plate, the smooth exterior surface defined on a distal end of the annular sidewall.

15. The appliance of claim 14, wherein the annular sidewall is disposed over at least a portion of the handle.

16. The appliance of claim 14, wherein the handle is positioned opposite the light emitter about the base plate of the light guide.

17. The appliance of claim 10, wherein the light guide comprises a circuit board and a plurality of light emitting diodes, the plurality of light emitting diodes distributed circumferentially on the circuit board.

18. The appliance of claim 10, wherein the post extends from the handle along an axial length of the post, the axial length of the post is greater than an axial length of the annular sidewall of the handle, the post extends along the axial length of the post through the bezel, and a width of the post perpendicular to the axial length of the post is less than a width of the annular sidewall of the handle.

* * * * *